United States Patent [19]

Johansson

[11] Patent Number: 5,189,829

[45] Date of Patent: Mar. 2, 1993

[54] INSECT TRAP

[76] Inventor: Nils-Vide I. Johansson, Rinkabyholmsvägen 63, Kalmar, Sweden, S-39477

[21] Appl. No.: 801,614

[22] Filed: Nov. 22, 1991

Related U.S. Application Data

[63] Continuation of Ser. No. 671,680, Mar. 19, 1991, abandoned, which is a continuation of Ser. No. 439,597, Nov. 20, 1989, abandoned.

[30] Foreign Application Priority Data

Nov. 11, 1988 [SE] Sweden .................. 8804173

[51] Int. Cl.⁵ .............................................. A01M 1/14
[52] U.S. Cl. .................................................... 43/114
[58] Field of Search ................ 43/114, 122, 123, 131, 43/136, 139, 115, 132.1

[56] References Cited

U.S. PATENT DOCUMENTS

| 360,957 | 4/1887 | Gardner | 43/114 |
| 491,427 | 2/1893 | Horton | 43/114 |
| 688,717 | 12/1901 | Clark | 43/114 |
| 2,911,756 | 12/1955 | Geary | 43/114 |
| 4,283,878 | 8/1981 | Hill et al. | 43/114 |
| 4,671,010 | 6/1987 | Conlee et al. | 43/114 |

Primary Examiner—Richard K. Seidel
Assistant Examiner—Chuck Y. Mah
Attorney, Agent, or Firm—Brumbaugh, Graves, Donohue & Raymond

[57] ABSTRACT

The present invention relates to a method and apparatus for catching insects using a glue trap, wherein a cord is coated with glue and optionally an attractant, and placed horizontally in an area where insects are to be caught. The present invention further comprises a device for distributing the apparatus.

12 Claims, No Drawings

INSECT TRAP

This application is a continuation of application Ser. No. 07/671,680, filed on Mar. 19, 1991, which is now abandoned and which was a continuation of application Ser. No. 07/439,597, filed Nov. 20, 1989, also abandoned.

BACKGROUND OF THE INVENTION

The present invention broadly relates to an insect trap and more, specifically, a trap for flying insects within enclosed spaces such as restaurants, homes and stables. The invention further includes a method of trapping insects; dispensing means for the insect trap; and a process for the preparation of the insect trap.

Previously known methods for catching insects are largely based in the application of glue to a carrier, such as a paper strip covered with resinous glue which is then hung vertically in areas where insects are to be caught. The paper strip, having at least one adhesive surface, is stored in a cardboard cover and upon use is drawn out into the formation of a helix to expose the adhesive surface area for catching insects. Other known adhesive-type insect traps utilize large paper sheets which are generally covered on both sides with glue and optionally an attractant such as euginol. These large sheets are then suspended vertically in barns and stables or other insect infested areas.

It has been found that the known insect catching devices have a number of drawbacks. For example, they quickly become covered by dirt, dust, and other airborne contaminants and thereby lose their adhesive property; they obstruct activities around them; they are troublesome to hang up and take down, and with regard to the large surface area traps, i.e. about 0.5 m$^2$, they disrupt ventilation, which in barns and stables is important for the well-being of the animals. Furthermore, the larger insect-catching devices have even been known to catch small birds, which, of course, is undesirable. Finally, none of the known adhesive-type insect-catching devices is particularly aesthetically pleasing in restaurants, confectioner's shops, and other similar locations where food is sold or dispersed.

Nevertheless there is a general demand for the elimination of flies and other flying insects, since they are known carriers of disease and their bites can be irritating and painful. Since the use of poisons, particularly in enclosed environments, for the elimination of insects is not a preferred alternative, the need for a safe, effective, easy and attractive means for eliminating such insects continues to be of importance.

SUMMARY OF THE INVENTION

The object of the present invention is to provide a method and apparatus capable of catching insects, particularly in-door insects, such as flies, mosquitoes, wasps and plant pests. The insect trap is suitable for use in homes, restaurants, stables, barns, and other enclosed spaces.

It has been found that the present invention eliminates most, if not all of the aforementioned drawbacks of the known adhesive-type insect traps and moreover, unexpectedly results in an increase in the number of insects trapped over a fixed period of time as compared with the known prior art adhesive insect traps. In tests carried out where the present invention was compared with a vertically hanging paper sheets containing the same adhesive material and using the same amount of an attractant, the present invention caught more than ten (10) times the number of flies trapped by the paper means on an area one third as large as the paper trap.

The invention specifically comprises an adhesive-covered cord optionally covered with an attractant. The cord has a relatively small surface area, i.e. diameter, as compared to prior art adhesive traps and preferably, is positioned horizontally in an area where insects are to be caught.

DESCRIPTION OF THE PREFERRED EMBODIMENT

In accordance with the present invention, the cord used can be of any type and material as long as it has sufficient mechanical strength and does not exude a repelling agent, such as sisal and hemp which are known to repel flies. An inert white polypropylene cord, a polypropylene reinforced cord of cotton, or a pure cord of natural fiber such as cotton are all suitable for use. The diameter of the cord, prior to being coated with a suitable adhesive, is from about 2.5 to 4.0 mm, preferably 3.0 to 3.5 mm. After coating with an adhesive material, the diameter ranges from about 3.0 to 5.0 mm and preferably from about 3.5 to 4.3 mm. A cord with the diameter of 3.2, after being coated with a sufficient amount of an adhesive, generally has a diameter of about 4.0 mm and it has been found that this dimension is optimal.

Suitable glues or adhesives are styrene based adhesives, NR-based adhesives, and resin based glues, (i.e. such glues/adhesives which are normally used in insect catching devices). The consistency of the glue should be adapted so as to be effectively adhesive at a temperature of from about 18 to 22° C. The consistency of the adhesive must also be effective with regard to the humidity present in the environment in which the insect trap is to be used. If the glue/adhesive is sensitive to UV light, such as sytrene based adhesives, they should not be exposed to a direct radiation from the sun. Of course, the adhesives may also contain a suitable unprotecting agent, provided that it does not diminish the effectiveness of the adhesive and does not act to repel insects.

The cord can also be impregnated or coated with a suitable attractant, such as euginol, eutanol, or ethanol for flies, and other known attractants for other insects, such as for mosquitoes or wasps. However, the attractant used should not diminish the effectiveness and preferably should cause the glue/adhesive to act as a plasticizer for the adhesive.

In accordance with the present invention, the cord may be stretched horizontally, or hung or stretched vertically form a suitable supporting surface. Thus, both high and low placements can be used, depending on the type of insect or even the specie within an insect family to be caught. Particularly in stables, barns and green houses the cord is preferably stretched horizontally from suitable support members, such as rafters or beams.

The adhesive coated cord may be dispensed from a roll arranged on a supply drum, which is drawn underneath a ceiling or along a wall, optionally via one or more pulleys to a collecting drum, whereby a suitable length of new cord can be fed by means of a hand crank or by motor. In the latter case, the motor can be controlled in different ways, e.g. by a time relay, so that a predetermined length of cord per 24 hours, as required, can be released. When a drum has become full, it is easily disposed of and a new drum with a fresh cord is installed. If the drums are treated with a silicon oil the glue will not adhere to the drum surfaces.

The cord trap can also be designed in different ways to be adapted to different environments and surroundings. Thus, it can be cut into small lengths and used in flower pots and flower boxes to eliminate plant insects and flies. It can be fashioned into decorative designs and shapes such as a rosette on a stick to be placed among plants in a window. In restaurants and confectioners shops, the cord trap can be hidden behind a curtain rod, if so desired and the cord and or adhesive may be colored.

EXAMPLE 300 m of a polypropylene cord (split fibre) with a diameter of 3.2 mm were impregnated with euginol in an amount of 2.5 g per 300 m. The cord was then coated with an elastomer based melting glue (styrene based, viscosity: 2800 mPas at 80° C.; softening point: 52° C. according to the ring-ball method; Hernimelt 8693, Hernia International AB, SE) by dragging the cord through a container containing the glue up to a diameter of 4.0 mm. 0.84 kg of styrene based glue were used. (The impregnation of the cord by an attractant can be accomplished in different ways, such as a gaseous method, dissolving the attractant in the glue, or spraying the attractant onto the cord using an atomized attractant.)

TEST 1

22 m of the cord according to the Example above were stretched horizontally in a barn. A paper sheet covered with the same glue and the same attractant, and having an area 0.88 m² was arranged vertically under the same conditions. The area of the cord was 0.28 m²/22 m. The cord caught 200 flies during 1 minute, while the paper sheet caught 17 flies during the same time period. The cord thus caught about 30 times more flies per area unit during 1 minute than did the paper sheet.

TEST 2

The same cord as produced according to the Example above was stretched horizontally as well as vertically in a barn. 1 m long cord segments were hung vertically down from the horizontal cord on each running meter. The amount of vertical cord was thus equal to the length of horizontal cord. The horizontal cord caught 72 flies in 1 minute compared with 30 flies in 1 minute for the vertical cords. The horizontal cord thus caught twice as many flies. Compared with Test 1 above, however, the vertical cords caught more flies per time unit and area unit than the paper sheet did.

TEST 3

In a kitchen, a cord prepared according to the Example above was hung horizontally. A conventional paper strip (5×100 cm) was also hung in the kitchen. While the cord caught 12 flies, the paper strip had caught only 1 fly during the past period. The glue and the attractant were the same in both cases.

TEST 4

In order to determine the difference between a cord with glue and attractant, and a cord with glue only, two such cords were stretched horizontally in a barn under the same conditions. No significant difference in the amount of flies caught could be determined.

The presence of an attractant is thus not necessary for the present invention. The trapping ability is substantially related to the cord shape, and unexpectedly when it is stretched horizontally, as opposed to vertically.

TEST 5

In a further test, a cord according to the present invention was compared with a paper strip, both types being arranged horizontally. The length of the cord was 1000 mm and its diameter was 3.2 mm, uncoated. The length of the paper strip was 1000 mm as well, and its width was 50 mm. The two catching devices were coated with the same glue and attractant. The cord and the strip, respectively, were arranged horizontally under the same outer conditions. Each cord and strip were replaced after each 24 hour period. The results are given in the Table below. Fly: *Musca domestica*. As shown in the table, the cord of the present invention caught significantly more flies than did the conventional paper strip.

TABLE

| | Number of flies caught | |
|---|---|---|
| Day | Cord | Strip |
| 1 | 12 | 1 |
| 2 | 6 | 0 |
| 3 | 24 | 6 |
| 4 | 18 | 4 |
| 5 | 36 | 8 |
| 6 | 12 | 2 |
| 7 | 66 | 13 |
| 8 | 36 | 7 |
| 9 | 72 | 26 |
| 10 | 111 | 32 |
| 11 | 96 | 31 |
| 12 | 42 | 8 |
| 13 | 21 | 6 |
| 14 | 118 | 29 |
| 15 | 42 | 7 |

While the foregoing describes and provides examples of the present invention and preferred embodiments, methods of use and dispensing means, it will be apparent in those of ordinary skill in the art, that changes and modifications may be made without departing from the invention in its broad aspect.

I claim:

1. A method for trapping insects comprising coating a cord with a suitable adhesive material and arranging said coated cord in a substantially horizontal position in an enclosed space where insects are to be caught.

2. A method according to claim 1 wherein the cord is selected from the group consisting of natural, or synthetic, or a mixture of natural and synthetic materials.

3. A method according to claim 1 wherein the diameter of the cord does not exceed about 4.0 mm.

4. A method according to claim 1 wherein the diameter of the cord is from 3.0 to 3.5 mm.

5. A method according to claim 1 wherein the diameter of the cord is 3.2 mm.

6. A method according to claim 1 wherein the adhesive material is selected from the group consisting of styrene-based adhesives, NR-based adhesives and resin-based adhesives.

7. A method according to claim 1 wherein the diameter of the cord after being coated with the adhesive is not greater than about 5.0 mm.

8. A method according to claim 7 wherein the diameter of the adhesive-coated cord is from about 3.0 to about 5.0 mm.

9. A method according to claim 1 wherein the diameter of the adhesive-coated cord is about 4.0 mm.

10. A method according to claim 1 further comprising an insect attractant.

11. A method according to claim 10 wherein the insect attractant is selected from the group consisting of eugenol, eutanol and ethanol.

12. A process for preparing an insect trap comprising the steps of:
  (a) selecting a suitable cord having sufficient mechanical strength;
  (b) selecting a suitable adhesive for coating the cord;
  (c) coating the cord with the adhesive so that the diameter of the coated cord does not exceed about 5.0 mm; and
  (d) arranging the cord in a substantially horizontal position in an enclosed space where insects are to be caught.

* * * * *